(12) United States Patent
Niu et al.

(10) Patent No.: US 7,242,947 B2
(45) Date of Patent: Jul. 10, 2007

(54) METHOD AND APPARATUS FOR DETERMINING THE LOCATION OF A UNIT USING NEIGHBOR LISTS

(75) Inventors: Feng Niu, Weston, FL (US); Spyros Kyperountas, Coral Springs, FL (US); Frederick L. Martin, Plantation, FL (US); Jian Huang, Coral Springs, FL (US); Qicai Shi, Coral Springs, FL (US); Timothy Bancroft, Boca Raton, FL (US); Neiyer S. Correal, Cooper City, FL (US)

(73) Assignee: Motorola, Inc., Schaumburg, IL (US)

( * ) Notice: Subject to any disclaimer, the term of this patent is extended or adjusted under 35 U.S.C. 154(b) by 473 days.

(21) Appl. No.: 10/743,961

(22) Filed: Dec. 23, 2003

(65) Prior Publication Data

US 2005/0134456 A1    Jun. 23, 2005

(51) Int. Cl.
*H04Q 7/20* (2006.01)

(52) U.S. Cl. .................. 455/456.1; 455/41.2; 455/457; 455/404.2

(58) Field of Classification Search ............. 455/456.1, 455/41.2, 457, 404.2; 340/539.23
See application file for complete search history.

(56) References Cited

U.S. PATENT DOCUMENTS 5,898,367 A    4/1999   Berube
6,288,675 B1 *  9/2001   Maloney ..................... 342/457
6,360,098 B1 *  3/2002   Ganesh et al. .............. 455/436

FOREIGN PATENT DOCUMENTS

WO        WO 01/57547     *  8/2000

OTHER PUBLICATIONS

Chris Savarese; "Robust Positioning Algorithms For Distributed Ad-Hoc Wireless Sensor Networks"; Master Thesis, UC Berkerly, 2002; 60 pages, no month listed.
Nirupama Bulusu; "Self-Configuring Localization Systems"; Ph.D. Thesis, UCLA; Oct. 2002; 161 pages.
P. Bahl, V.N. Padmanabhan; "Radar: An In-Building RF-Based User Location And Tracking System"; Proceedings IEEE Infocom 2000, vol. 2, pp. 775-784; Apr. 2000; Ekahau in Finland.

* cited by examiner

*Primary Examiner*—Jean Gelin
*Assistant Examiner*—Phuoc Doan
(74) *Attorney, Agent, or Firm*—Lawrence J. Chapa (57) ABSTRACT

A method and location determination module is provided for determining a location of one of a plurality of units using neighbor lists. Each unit is communicatively coupled to at least some of the other plurality of units, where at least some of the plurality of units are reference units, whose locations are known. The units communicate with other nearby units within communication range, to establish neighbor lists. A unit to be located then identifies an aggregate value corresponding to the number of occurrences of the reference units in the neighbor list of the unit to be located and the neighbor lists of each of a group of associated units. The location of the unit to be located is then determined, based upon the known locations of the reference units and the number of identified occurrences of the reference units in the corresponding neighbor lists.

27 Claims, 4 Drawing Sheets

METHOD AND APPARATUS FOR DETERMINING THE LOCATION OF A UNIT USING NEIGHBOR LISTS

STATEMENT REGARDING FEDERALLY SPONSORED RESEARCH OR DEVELOPMENT

This invention was made with United States Government support under 70NANB2H3001 awarded by the National Institute of Standards and Technology (NIST). The United States Government has certain rights in the invention.

FIELD OF THE INVENTION

The present invention relates generally to the location of a unit operating within a network including a plurality of units, and more particularly, to the determination of a location, based upon the detected presence of units, whose locations are known, near the unit to be located and their presence near other units, which are nearby the unit to be located.

BACKGROUND OF THE INVENTION

In densely populated networks, one such example including a warehouse, where it is desirable to track the location of items located in relatively close proximity, a system may include tens of thousands items to be tracked. Still further, in connection with the warehouse example, the large volume of items may be moving into and out of the warehouse with considerable frequency, where some of the units may stay in place for only a few minutes and others may stay in the same place for days or weeks. The large volume of items and the constant shuffling of the items can make it difficult to maintain an accurate fix on any one item's location within the warehouse. The same is true of other environments, where it is desirable to track the current location of large groups of items, which are within relatively close proximity.

Traditional triangulation or other relative location technologies, often generally require an ability to make good ranging measurements. This is especially problematic for a high density environment, like a warehouse, where there are a large number of surfaces off of which a signal can reflect, and/or where the item density requires a relatively high degree of precision in order to allow for the item to be readily distinguished from the other nearby items.

In absence of a realistic path loss model in an ever changing environment, power-based measurements, such as an indication of received signal strength, may not provide good ranging information. Where ranging is determined using time-based measurements, micro-second range resolution will often only enable a range resolution in the hundreds of meters, while nano-second resolution will often be required to enable a range resolution on the order of approximately one meter. However, generally, there is an inverse relationship between cost and timing resolution, and unfortunately, in environments where large number of items are to be tracked, the higher cost of higher precision timing circuits can be an important factor, and may be impractical if the higher precision timing circuits need to be associated with or incorporated into each of the items to be tracked.

Consequently, it would be beneficial to develop a cost effective method and apparatus for determining a location of a plurality of units. Still further, it would be beneficial to develop systems and methods that produce a sufficiently high location determination precision, which could be used in more crowded environments having higher item density, which largely avoids extensive usage of potentially more costly, solutions involving higher precision ranging measurements.

The present inventors have recognized that the use of neighbor lists, in conjunction with a subset of units who know or are able to determine their location may be a beneficial alternative approach, as opposed to a solution, which makes more comprehensive usage of determined ranging information. The neighbor lists could be used to establish proximity relative to one or more units that are nearby, and whose location are known. By incorporating the use of neighbor lists of nearby units, a relative proximity with respect to the reference units whose location are known may be able to be determined, which in turn can be used to provide a location estimate.

SUMMARY OF THE INVENTION

The present invention provides a method for determining a location of one of a plurality of units, each unit being communicatively coupled to at least some of the other plurality of units, where at least some of the plurality of units are reference units, whose locations are known. The method includes communicating with the units within communication range of the unit to be located, and establishing a neighbor list for the unit to be located and each of a group of associated units, where the associated units are a subset of the plurality of units and include one or more units other than the unit to be located, which are located proximate to the unit to be located. The neighbor list includes the list of the units that are in communication range of the respective associated unit.

Any reference units contained in each of the neighbor lists of the unit to be located and the associated units are then identified, and an aggregate value corresponding to the number of occurrences of each of the reference units in the neighbor list of the unit to be located and the neighbor lists of each of the associated units is determined. The location of the unit to be located is then determined, based upon the known locations of the reference units and the aggregate value of identified occurrences of each of the reference units in the corresponding neighbor lists.

In at least one embodiment, the associated units include the units within communication range of the unit to be located.

In at least a further embodiment, the reference units are substantially stationary, and are proximately spaced at regular intervals.

In a still further embodiment, the reference units are mobile and include provisions for periodically updating the reference units' location information.

The present invention further provides a location determination module for use in a system of a plurality of units, wherein at least some of the units are reference units, whose location are known, and each unit is communicatively coupled to at least some of the other units. The location determination module includes a transceiver having a finite communication range, and a processor, coupled to the transceiver. The processor includes a storage area for maintaining a neighbor list including a list of the units within communication range of the transceiver, a discriminator for distinguishing between reference units and non-reference units contained in one or more neighbor lists, and a calculation element for determining an estimated location. The estimated location is based upon the number of occurrences of each of the reference units in the neighbor list and the neighbor lists of a plurality of associated units, and the known location of the reference units.

These and other features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
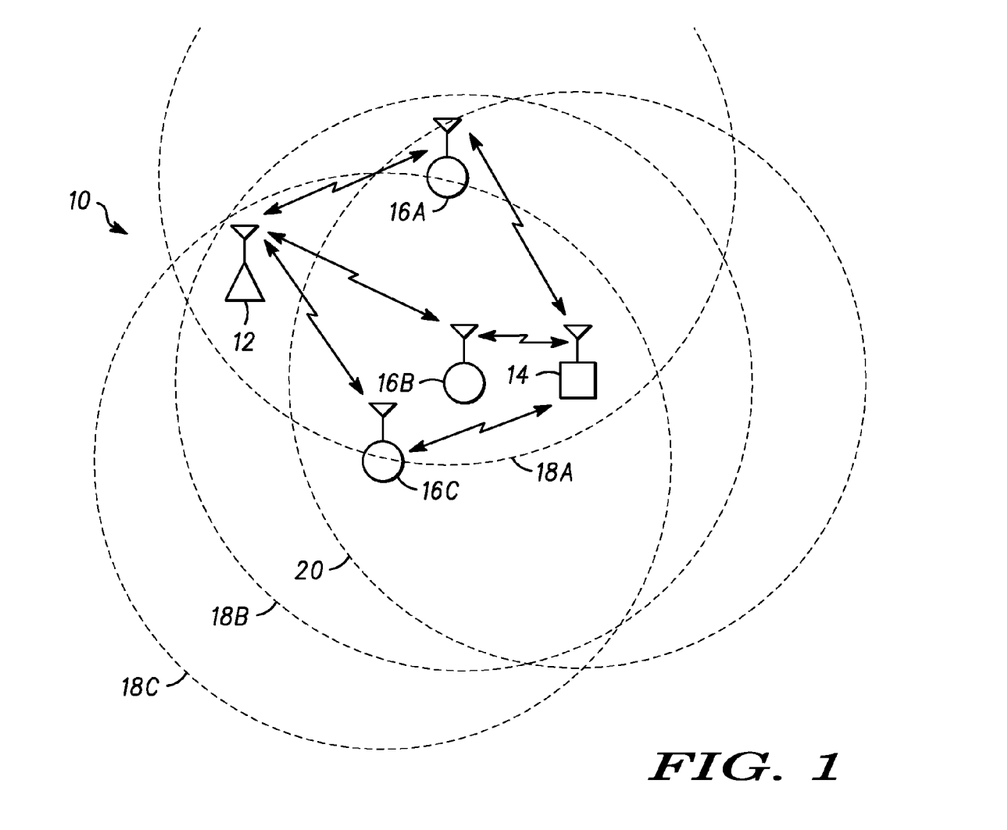
FIG. 1 is a partial spatial overview diagram illustrating an exemplary spatial relationship between nearby members of at least a portion of a communication network, in accordance with at least one embodiment of the present invention.

FIG. 1 illustrates a diagram illustrating an exemplary spatial relationship between nearby members of at least a portion of a communication network 10, including a reference unit 12, illustrated as a triangle, and four blind units, one of which is illustrated as a square and represents a unit 14 to be located. The other three units 16A–C are illustrated as circles, and represent other blind units present in the network. Generally, a reference unit corresponds to a unit, whose location is known, and a blind unit represents one of one or more units for which the unit's location would need to be determined and/or estimated.

Each unit, generally, includes a transceiver and corresponding antenna, which support wireless communication between the other units within communication range. An exemplary communication range 18A–C for each of the blind units including an exemplary communication range 20 for the blind unit 14, which is being located, is illustrated. The communication range is illustrated by a circle having a center which generally corresponds to the respective blind unit. In the illustrated embodiment, the reference unit 12 is shown outside of the communication range of the blind unit to be located 14, but is in communication range of the other three illustrated blind units 16A–C, which are also in communication range with the blind unit to be located 14.

Despite being out of range of one another, in at least some instances, a communication path between the reference unit 12 and the blind unit to be located 14 can exist if the communication is relayed via one or more of the other blind units 16. Such a communication can be relayed via a single blind unit 16 if the blind unit is within transmission range of both the reference unit 12 and the blind unit to be located 14. Such a communication path may be identified as a multi-hop communication path within a network where one or more intermediate units are needed to relay the communication, or more specifically a two-hop communication where only a single intermediate unit is necessary.

In at least one embodiment of the present application, a nearby unit is generally included on a unit's neighbor list if the nearby unit is within communication range of the unit. Such a list can be maintained by keeping a list of the originator of recently received signals that are periodically broadcast by units within the network and monitored by each of the other units.

Figure 2:
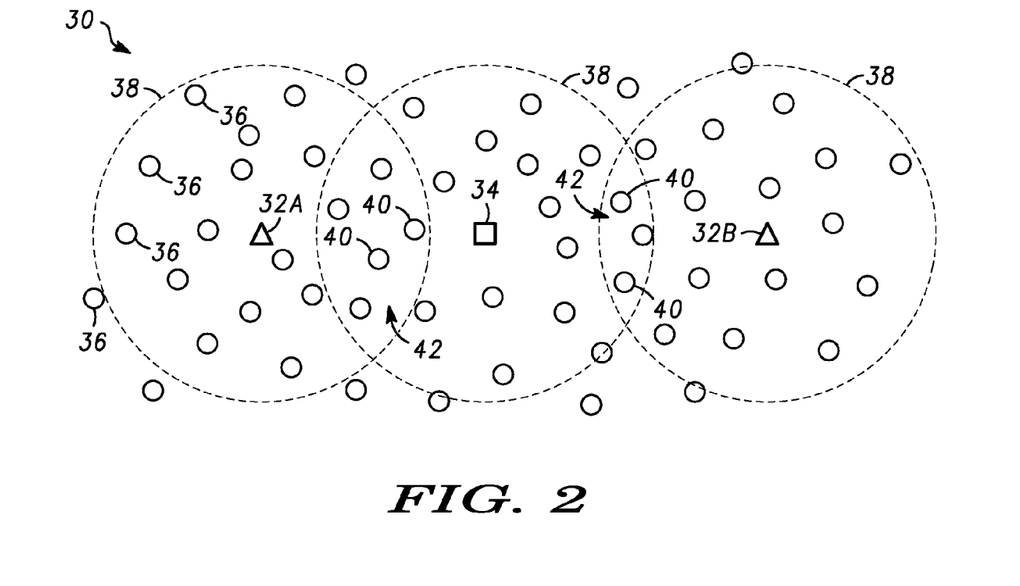
FIG. 2 is a more complete spatial overview diagram of an overview of at least a portion of an exemplary communication network illustrating the spatial relationship between a greater number of nearby members from a portion of the communication network.

FIG. 2 illustrates a more complete diagram of an overview of at least a portion of an exemplary communication network 30 illustrating the spatial relationship between members of a portion of the communication network 30. Similar to FIG. 1, the members are illustrated using triangles, squares, and circles. The triangles similarly correspond to the location of reference units 32, the square similarly corresponds to a blind unit 34, which is the unit to be located, and the circle corresponds to the other nearby blind units 36, (only some of which have been associated with the corresponding reference number).

Similar to FIG. 1, each of the units have a corresponding communication range. In FIG. 2, a communication range is illustrated for both the pair of reference units 32 and the unit to be located 34. In at least the illustrated embodiment, the communication range 38 is approximately the same for each of the units including the nearby blind units.

In the present invention, a unit determines its relative proximity to the nearby reference units 32, based at least in part on the number of associated units 40, which are within communication range with the one or more nearby reference units 32. The closer a unit 34 is to a reference unit 32, the greater the likelihood that a larger number of associated blind units 40 will be nearby, which include the reference unit 32 in its neighbor list. In a two-hop system, where the associated units 40 are defined as the units within communication range of the unit to be located 34, the number of associated units 40 which include a particular reference unit will be the units which fall within a communication overlap region 42, which is larger when the unit to be located is closer to the reference unit. Generally, larger overlap regions have a greater chance that a larger number of other nearby blind units 36, will be contained in the overlap region 42.

The estimated location of the unit to be located 34, is then determined based upon a weighted average of the known location of the reference units, which are in communication range of either the unit to be located 34 or the other associated blind units 40. The weighting, in at least one instance, is based upon the total number of neighbor lists including the neighbor list of associated units 40 and the neighbor list of the unit to be located 34, that include a particular reference unit 32. For example, in the illustrated embodiment, the reference unit 32A is present in five associated unit's neighbor lists, while reference unit 32B is present in three associated unit's neighbor lists.

In at least one embodiment, the weighting is equal to the determined number of neighbor list occurrences. In the illustrated embodiment this would result in an estimated location based upon the formulas:

$$X_{34}=(5X_{32A}+3X_{32B})/8$$

$$Y_{34}=(5Y_{32A}+3Y_{32B})/8$$

$$Z_{34}=(5Z_{32A}+3Z_{32B})/8$$

wherein the variables X, Y and Z, correspond to the location of the identified units, for which the location of the reference units is presumed to be known.

The formula could be expanded, as necessary, to take into account additional reference units, which may be present in the associated neighbor lists, and which would expand the number of terms and weighting values used in the numerator and would also affect the sum of the weighting values, which in turn is used in the denominator when formulating the averages.

While in the above noted example the weighting value used is directly equal to the number of relevant neighbor list occurrences, it is further possible that the weighting value could be determined based upon a formula, which takes into account other features associated with each of the occurrences, or which further modifies the determined number of occurrences. For example the specific weighting value associated with the averaging of each of the known reference locations could be based upon the square root of the number of occurrences in the relevant neighbor lists, or some other mathematical formula, which is historically determined to produce the desired results. The specific value could also be specifically tailored to accommodate different methods of determining the associated units. For example, one such embodiment might count the number of occurrences of each reference unit that occurs in the neighbor lists of units, which are more than one hop away from the unit to be located 34.

Still further, the number of different occurrences in neighbor lists of associated units may be counted at full or different fractional values dependent upon the number of hops the particular associated blind unit 40, corresponding to a particular neighbor list, is away from unit to be located 34.

Further yet, the formula for determining the weighting value based upon the number of occurrences in the associated neighbor lists could be adjusted based upon the relationship between the average distance between the reference units 32 and the average communication range 38 of each of the units.

More generically, the formulas can be represented as:

$$X_{34}=(W_{32A}X_{32A}+W_{32B}X_{32B}+\ldots)/(W_{32A}+W_{32B}+\ldots)$$

$$Y_{34}=(W_{32A}Y_{32A}+W_{32B}Y_{32B}+\ldots)/(W_{32A}+W_{32B}+\ldots)$$

$$Z_{34}=(W_{32A}Z_{32A}+W_{32B}Z_{32B}+\ldots)/(W_{32A}+W_{32B}+\ldots)$$

where $X_{32\#}$, $Y_{32\#}$, $Z_{32\#}$ are the known coordinates of the corresponding reference units, and $W_{32\#}$ is the determined weighting.

Figure 3:
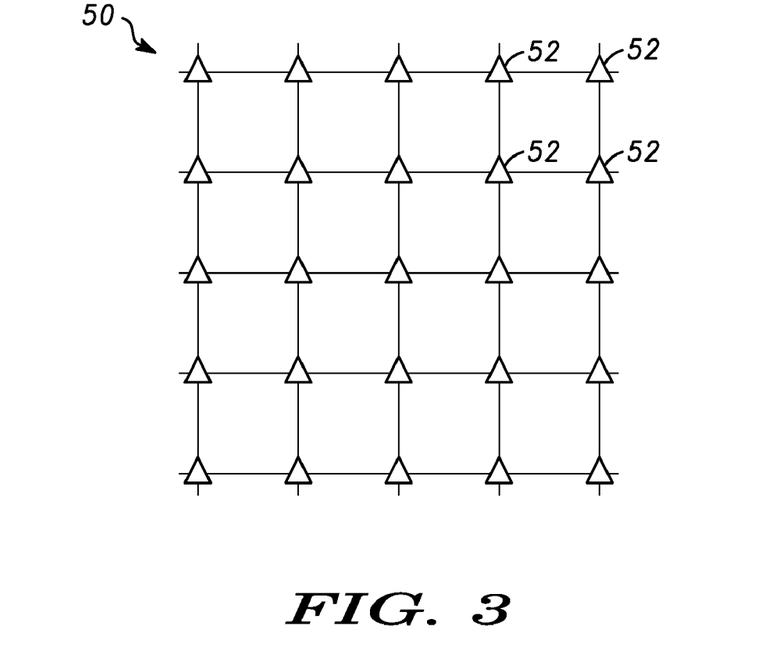
FIG. 3 is an example of possible placement of a set of reference units, which can be generally substantially stationary, for use by other nearby units in determining a location within an area, in accordance with at least one aspect of the present invention.
Figure 4:
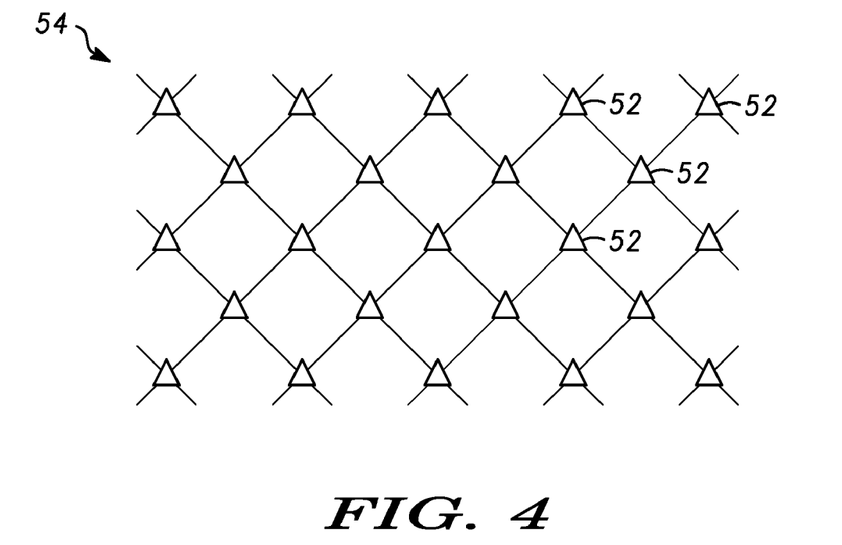
FIG. 4 is at least a further example of possible placement of reference units, which can be substantially stationary, for use in determining a location within an area, in accordance with at least a further aspect of the present invention.

In at least one embodiment, a set of reference units 52 are arranged in a predetermined pattern 50, which traverses an area within which it is desirable to be able to locate a unit. One such example is illustrated in FIG. 3, where the reference units are generally equally spaced in both an east-to-west direction and a north-to-south direction, for purposes of estimating a location in at least two dimensions. In a further example, it may also be desirable to include similarly arranged layers spaced apart in an up-to-down direction, for purposes of assisting in the estimation of a location in an additional third dimension. In these instances, the reference units are spaced apart in two or more directions, which are generally orthogonal, relative to one another. FIG. 4 illustrates a still further possible predetermined pattern 54.

Generally, where the reference units 52 are associated with a predetermined pattern, the reference units 52 will often remain relatively stationary. In such an instance, the known or determined location value of each of the reference units could be preprogrammed or hard-coded into at least some of the units. In some instances, the particular location value could be stored in each of the corresponding reference units and communicated to the nearby blind nodes, when the blind nodes determine their neighbor lists. Additionally and/or alternatively, each of the blind nodes could include a master list of the location of each of the reference nodes.

In at least some embodiments, the reference units could be mobile. In some instances, the reference units, which are mobile, may be associated with a particular item whose location is similarly being tracked within the network. Because the reference units may be mobile, it may be necessary for these reference units to be able to periodically determine their current location, which could be accomplished using an independent location determining device. One example of an independent location determining device could include a device which separately communicates with reference stations, located external to the network, such as one or more base transceiver stations and/or one or more global positioning satellites. The independent location determining device could use different ranging techniques for purposes of triangulating their locations, such as time of arrival estimates, time difference of arrival estimates, and/or signal strength measurements, for communications between the reference units and the reference stations, when the reference units update their location.

Such an approach would allow a portion of the units to be tracked, which include the generally more costly ranging circuitry, and in turn operate as reference units, which are then used in the determination of the other units, which would not necessarily include any ranging circuitry, using the above noted neighbor list location estimation technique. Where the reference units are mobile, and therefore periodically needing to determine their location using an alternative location determining technique, a predetermined and prestored master location list present on the blind nodes, may not be practical. In such an instance, the reference nodes current location could be communicated and stored, at the same time the neighbor list for each of the units is determined and compiled.

Figure 5:
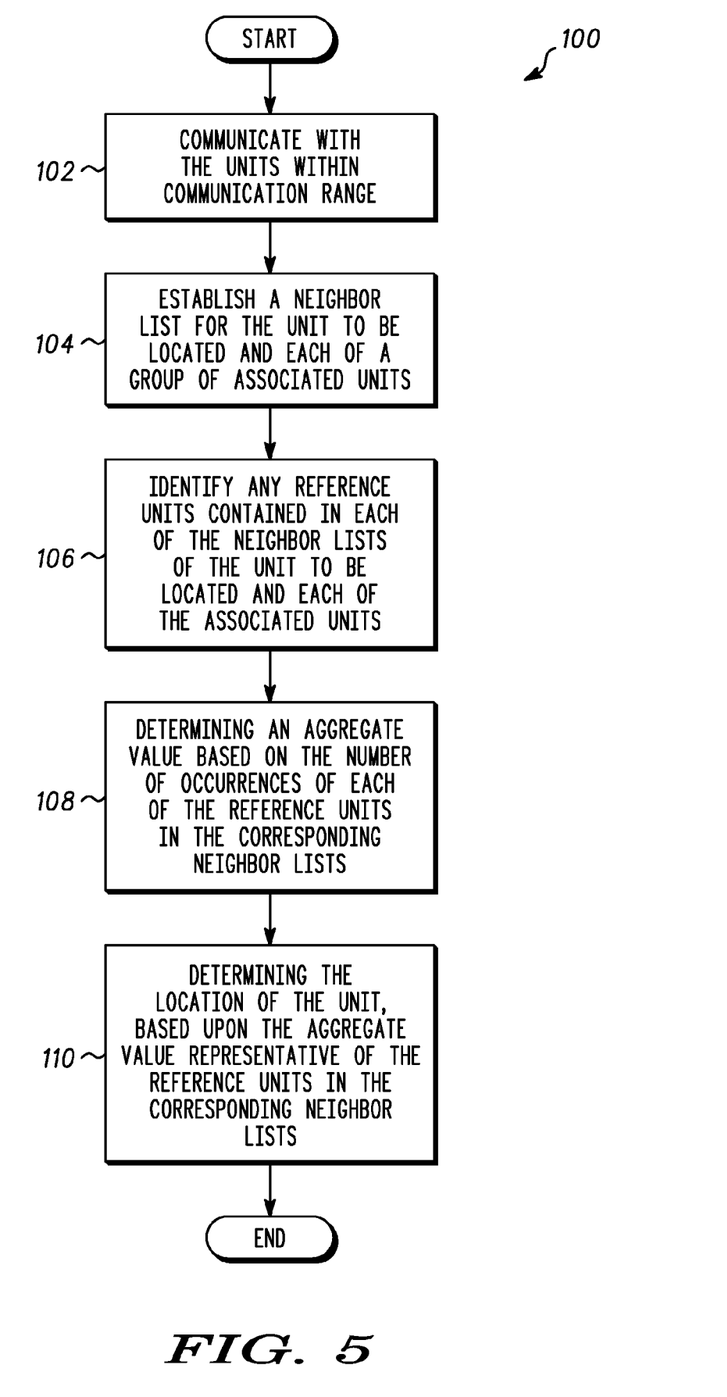
FIG. 5 is a flow diagram of a method for determining a location of a unit, in accordance with at least one embodiment of the present invention.

FIG. 5 illustrates a flow diagram of a method 100 for determining a location of a unit, in accordance with at least one aspect of the present invention. The method generally includes the unit to be located communicating 102 with the units within communication range. Neighbor lists are then established 104 for the unit to be located and each of a group of associated units. Reference units contained in each of the neighbor lists of the unit to be located and each of the associated units, are identified 106. An aggregate value of occurrences of each of the reference units in the corresponding neighbor lists is determined 108. Lastly, the location of the unit is determined 110 and/or estimated, based upon the aggregated value of the occurrences of the reference units in the corresponding neighbor lists.

As noted above, determining an aggregate value can be based upon counting the number of occurrences of each of the reference units in the neighbor list of the unit to be located and the neighbor list of each of the associated units, where in at least one embodiment the associated units includes the units in communication range of the unit to be located (i.e. 1-step away).

In at least one embodiment, a weighted average of the locations of the reference units identified in the corresponding neighbor lists is determined for purposes of estimating the location of the unit to be located.

Figure 6:
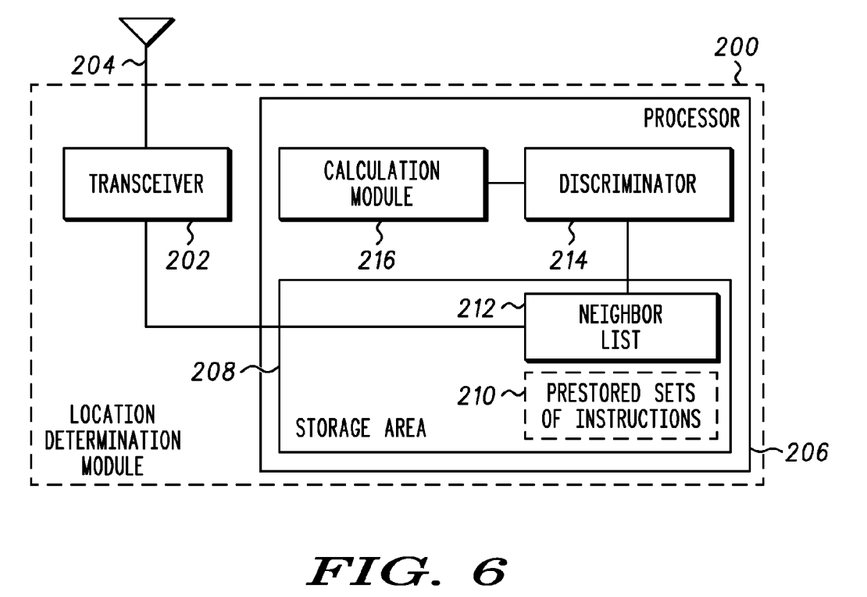
FIG. 6 is a block diagram of a location determination module for use in a unit to be located, in accordance with at least one embodiment of the present invention.

FIG. 6 illustrates a block diagram of a location determination module 200 for use in a unit to be located 14, in accordance with at least one embodiment of the present invention. The location determination module 200 includes a transceiver 202 coupled to an antenna 204 for facilitating the wireless communication with other nearby units, and a processor 206 coupled to the transceiver 202. The processor 206 includes a storage area 208, which is adapted for storing data and/or sets of prestored instructions 210. At least some of the data takes the form of one or more neighbor lists 212, which are used to identify other units that are within communication range of the unit to be located 14. Additional data, which can be stored in the storage area may include one or more sets of predetermined locations associated with a set of reference units 12 and/or current location values associated with the reference unit 12 received via communications with other nearby units.

The processor 206 further includes a discriminator 214, coupled to the storage area 208 for accessing the one or more stored neighbor lists 212, which is adapted for distinguishing between reference units and non-reference units contained in the one or more neighbor lists stored in the storage area 208. In at least one instance, a data bit could be set, which identifies the reference unit, or alternatively, all of the reference units may have an identification value, which falls within a predetermined range. One skilled in the art will appreciate that other techniques could alternatively be used, techniques which the discriminator 214 would be designed to detect.

The processor 206 additionally includes a calculation module 216, which determines the number of occurrences of each of the reference units 12 in the corresponding associated neighbor lists, and determines a location estimate for the unit to be located 14, based upon the determined number of occurrences and the known location of the corresponding reference units 12. In at least one embodiment, the discriminator and/or the calculation module can be implemented in the processor 206 as one or more sets of prestored instructions, stored in the storage area 208, and which are executed by the processor 206.

Generally, the location determination module 200 can be used in connection with the location of individual items and/or palettes of items in a warehouse environment, as suggested above. However, the location determination module 200 has additional applicability in other networks, wherein the determination of the location of individual elements is desired and a corresponding set of reference units and other non-reference units are available throughout the area to assist in determining a location estimate. At least one such example includes the location of devices such as one or more cellular telephones or other wireless communication devices located within a network.

Still further, the location determination module could be incorporated as part of the equipment for one or more groups of personnel operating in concert within a given area or environment. One such example includes emergency personnel. In this instance the location determination module could be located in one or more of a fire fighter's helmet, jacket, or other piece of equipment.

Further yet, the location determination module could be made to function with many different forms of wireless communications including communications using a cellular telephone radio transceiver, a cordless telephone radio transceiver, a wireless LAN connection, a short range radio transceiver, such as a Bluetooth transceiver, an infra-red communication transceiver, or other similar communication device not constrained by a physical wired connection. Still further the location module could interact with an installed sprinkler system, which might include wireless transceivers, which function as reference units.

Figure 7:
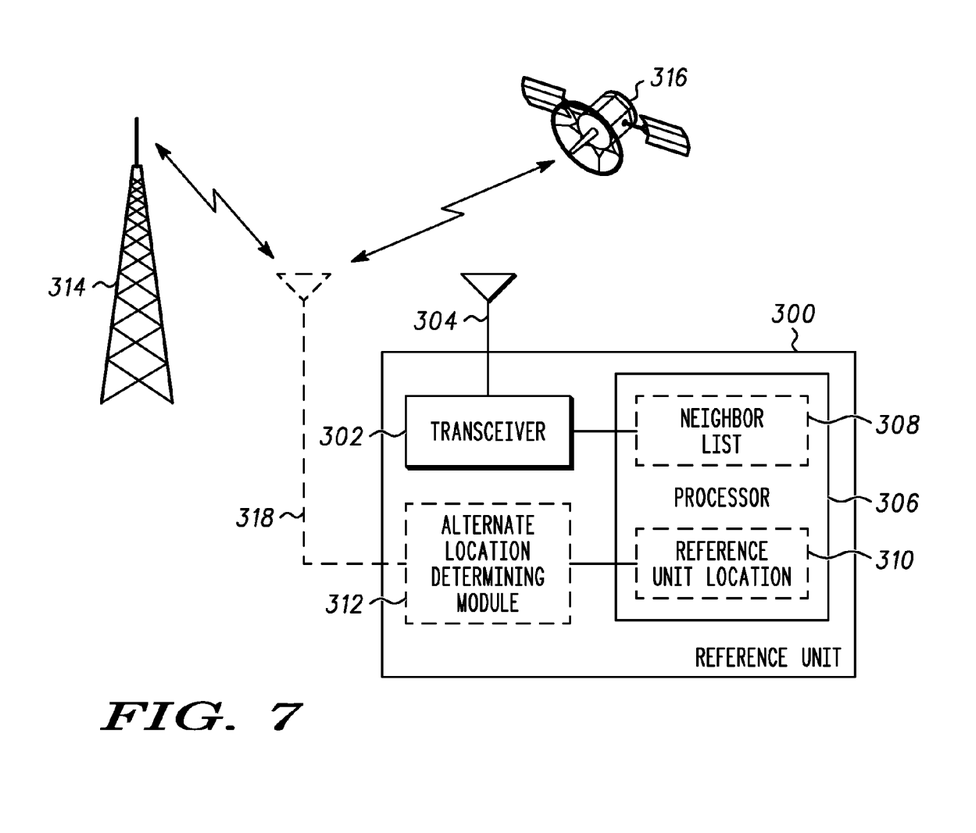
FIG. 7 is a block diagram of a reference unit for use in determining the location of the unit to be located, in accordance with at least one embodiment of the present invention.

FIG. 7 illustrates a block diagram of a reference unit 300 for use in determining a location estimate of the unit to be located, in accordance with at least one embodiment of the present invention. The reference unit 300 includes a transceiver 302 and corresponding antenna 304. In at least some embodiments, the transceiver 302 has at least one operating mode, in which the communication range is substantially similar to the transmission range of a corresponding operating mode associated with the location determination module 200. The reference unit additionally includes a processor 306, coupled to the transceiver 302, which manages the overall operation of the reference unit 300.

In some instances, the processor 306 of the reference unit 300 will maintain, store and communicate, as needed, a neighbor list 308. The processor 306, in at least some of the same or other instances, may also include a reference unit location 310, which can be either determined, periodically or as needed, or can be previously determined, depending upon the operational characteristics of the unit. Where the unit is allowed to change location (i.e. the unit is not substantially fixed in place), the use of a predetermined previously stored location may be problematic, if the unit does not have an ability to determine and/or update its new location. At least some embodiments, may include an alternate location determining device 312, which can communication with one or more reference stations, which may be external to the networks, such as one or more base transceiver station 314 and/or one or more global positioning satellites 316.

Generally, the alternate location determining device 312 has a greater transmission range, which enables it to communicate with reference stations located beyond the bounds of the network. In some instances, this may be accomplished via a separate transceiver coupled to a separate antenna 318. In other instances, this may be accomplished by temporarily increasing the transmission power in conjunction with at least a second operating mode of transceiver 302, coupled to antenna 304. In at least some instances, the alternate location determining device 312 will include circuitry for determining range information relative to the reference stations. The range information can then be used by the reference unit 300, in conjunction with the known or determined location of the reference stations, in order to triangulate the postion of the reference unit 300. In turn, the determined location of the reference units 300 are used by the blind units 14 to estimate the location of one or more blind units to be located 14, as noted above.

In this way, a network environment is described, which includes units to be located, which can estimate their location, without the use of range determining circuitry, based upon the neighbor lists of the unit to be located 14 and neighbor lists of associated units and the corresponding number of occurrences of the reference units within the respective neighbor lists, and based upon the known location of the reference units.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of determining a location of one of a plurality of units, each unit being communicatively coupled to at least some of the other plurality of units, wherein at least some of the plurality of units are reference units, whose locations are known, said method comprising:
    communicating with the units within communication range of the unit to be located;
    establishing a neighbor list for the unit to be located and each of a group of associated units, wherein the associated units are a subset of the plurality of units and include one or more units other than the unit to be located, which are located proximate to the unit to be located, the neighbor list including the list of the units that are in communication range of the respective associated unit;
    identifying any reference units contained in each of the neighbor lists of the unit to be located and the associated units;
    determining an aggregate value corresponding to the number of occurrences of each of the reference units in the neighbor list of the unit to be located and the neighbor lists of each of the associated units; and
    determining the location of the unit to be located based upon the known locations of the reference units and the number of identified occurrences of the reference units in the corresponding neighbor lists.

2. A method in accordance with claim 1 wherein the associated units include the units within communication range of the unit to be located.

3. A method in accordance with claim 1 wherein determining an aggregate value corresponding to the number of occurrences of the each of the reference units in the neighbor list of the unit to be located and the neighbor lists of each of the associated units includes counting the number of occurrences.

4. A method in accordance with claim 3 wherein counting the number of occurrences of each of the reference units in the neighbor list of the unit to be located, and the neighbor lists of a plurality of associated units includes counting the number of occurrences of each of the reference units in the neighbor list of the unit to be located and the neighbor lists of each of the units contained in the neighbor list of the unit to be located.

5. A method in accordance with claim 1 wherein the location is determined based upon a weighted average of the locations of the identified reference units.

6. A method in accordance with claim 5 wherein the amount of the weighting for a particular reference unit is determined by the ratio of the number of occurrences of the particular reference unit and the total number of occurrences of all reference units.

7. A method in accordance with claim 1 wherein the communication range of each unit is substantially the same.

8. A method in accordance with claim 1 wherein the communication range of the unit to be located is smaller than the average distance between reference units.

9. A method in accordance with claim 1 wherein the reference units are substantially stationary.

10. A method in accordance with claim 9 wherein the substantially stationary reference units are proximately spaced at regular intervals a fixed predetermined distance apart.

11. A method in accordance with claim 10 wherein the substantially stationary reference units are proximately spaced at regular intervals a fixed predetermined distance apart in one or more substantially orthogonal directions.

12. A method in accordance with claim 1 wherein one or more of the reference units are mobile, and wherein as a reference unit moves the reference unit periodically updates the location of the reference unit.

13. A method in accordance with claim 1 wherein as the plurality of units move relative to one another, the plurality of units periodically update the corresponding neighbor lists.

14. A location determination module for use in a system of a plurality of units, wherein at least some of the units are reference units, whose location are known, and each unit is communicatively coupled to at least some of the other units, the location determination module comprises:
    a transceiver having a finite communication range; and
    a processor, coupled to the transceiver, the processor including a storage area for maintaining a neighbor list including a list of the units within communication range of the transceiver, a discriminator for distinguishing between reference units and non-reference units contained in one or more neighbor lists, and a calculation element for determining an estimated location, based upon the number of occurrences of each of the reference units in the neighbor list and the neighbor lists of a plurality of associated units, and the known location of the reference units.

15. A location determination module in accordance with claim 14 wherein the associated units include the units within communication range of the location determination module.

16. A location determination module in accordance with claim 14 wherein the calculation element is adapted for determining an estimated location using a weighted average of the locations of the identified reference units, which are weighted using the number of occurrences of each of the reference units in the corresponding neighbor lists.

17. A location determination module in accordance with claim 14 wherein the finite communication range is smaller than the average distance between reference units.

18. A location determination module in accordance with claim 14 wherein the neighbor list includes units within communication range of the transceiver.

19. A location determination module in accordance with claim 14 wherein the location determining unit is incorporated as part of a mobile communication device.

20. A location determination module in accordance with claim 19 wherein the mobile communication unit is a cellular radiotelephone.

21. A location determination module in accordance with claim 14 wherein the location determination module is incorporated into equipment used by a group of individuals acting in concert.

22. A location determination module in accordance with claim 14 wherein the reference units, used in the system of a plurality of units, are stationary beacons spaced at regular intervals.

23. A location determination module in accordance with claim 14 wherein the reference units, used in the system of a plurality of units, are mobile communication devices having an independent location determining device.

24. A location determination module in accordance with claim 23 wherein the independent location determining device includes a transceiver having a greater range than the transceivers of the location determination modules, the transceiver of the independent location determining device being adapted for communicating with a plurality of reference stations.

25. A location determination module in accordance with claim 24 wherein the plurality of reference stations include at least one of one or more orbital satellites and one or more base transceiver stations.

26. A location determination module in accordance with claim 24 wherein the independent location determining device is adapted for at least one of measuring signal strength and determining time of arrival of a signal transmitted from at least some of the plurality of the reference stations.

27. A location determination module in accordance with claim 14 wherein one or more of the discriminator and the calculation module includes one or more sets of prestored instructions contained within the storage area and to be executed by the processor.

* * * * *